May 15, 1962 F. ZANDMAN ET AL 3,034,344
MEASURING OR INDICATING SYSTEM AND APPARATUS
Filed April 2, 1957 2 Sheets-Sheet 1
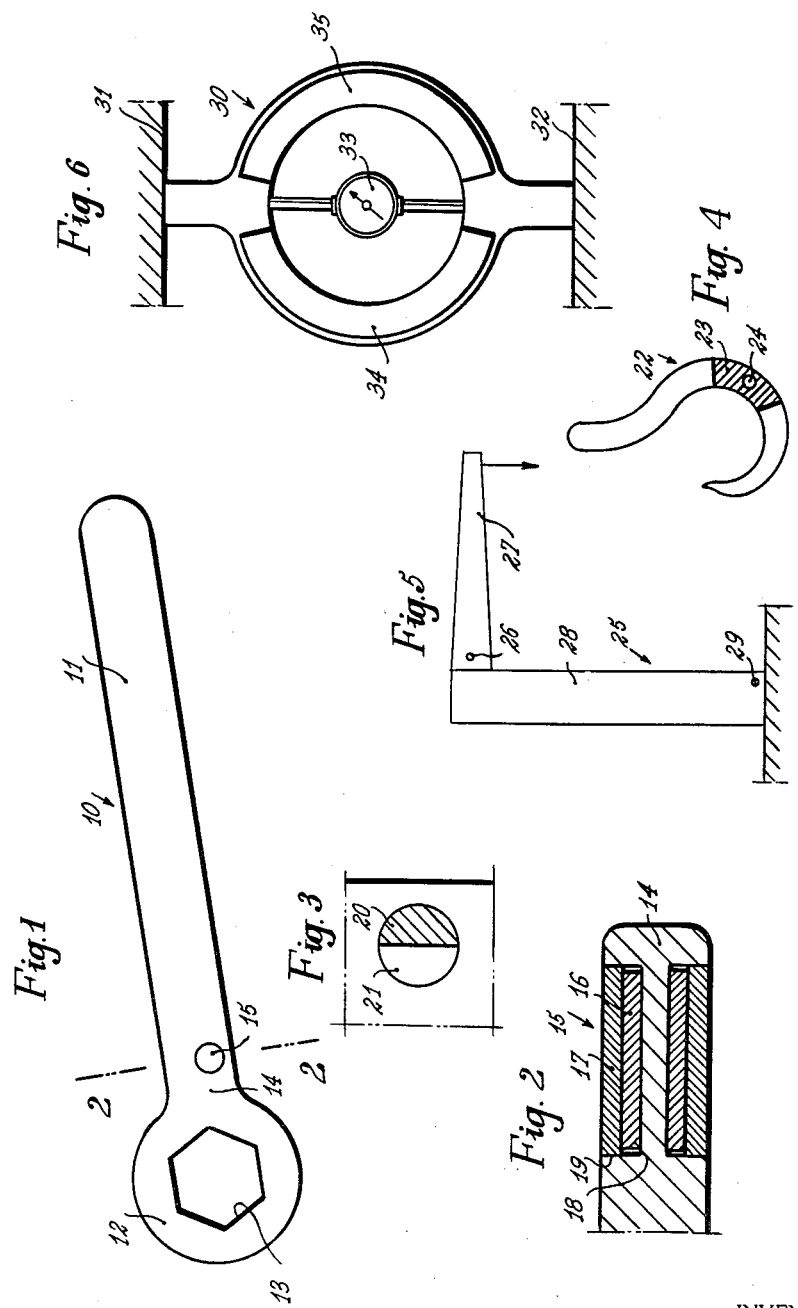
INVENTORS
FELIX ZANDMAN
JEAN AVRIL
BY Darby + Darby
ATTORNEYS

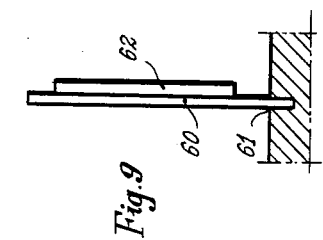
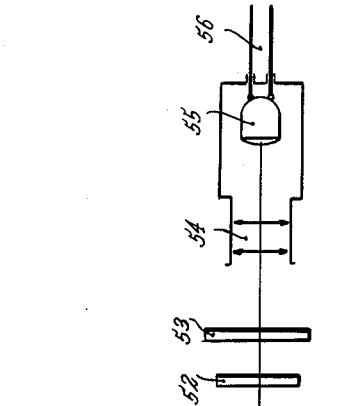
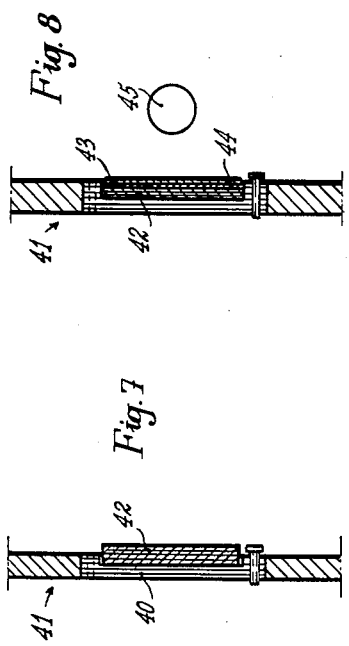
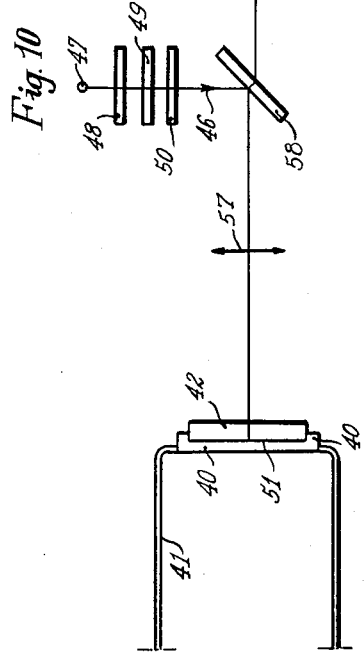

3,034,344
MEASURING OR INDICATING SYSTEM
AND APPARATUS
Felix Zandman, Paris, and Jean Avril, Boulogne, France, assignors, by mesne assignments, to The Budd Company, Philadelphia, Pa., a corporation of Pennsylvania
Filed Apr. 2, 1957, Ser. No. 650,238
Claims priority, application France Apr. 9, 1956
7 Claims. (Cl. 73—141)

This invention relates particularly to photoelastic measuring or indicating system and apparatus.

It is an object of the invention to provide improved mechanical means for the transfer of forces and torques which will yield an indication of the forces and torques transferred thereby by a change in the aspect of the means.

A more specific object is to provide an improved tool or implement adapted to change in appearance accordingly as the tool is transmitting a force or torque larger or smaller than a predetermined value.

Another specific object is to provide an improved tool such as a key or wrench which will be inherently adapted to indicate to the user whether a specified limit torque or pressure has or not been attained, by a mere observation of the tool itself.

It is consequently another object of the invention to provide tools which will be entirely safe to operate and which will provide a means of regulating the action exerted through the tool by simply observing the tool.

A further object is to achieve the above listed results without any modification in the general design and construction of a conventional tool and without adding any fragile or complicated attachments thereto, but retaining the original characteristics of ruggedness, simplicity in manufacture and handiness in use.

Yet a further object of the invention is to indicate that one or more parts of a mechanical assembly may be transmitting a stress higher than what was specified for such part or parts, such indication being given by an alteration in the visual aspect of the part or parts. In a similar connection it is an object to provide means for readily and instantaneously checking whether or not an apparatus or system is operating under security conditions specified in advance.

Still another object is to provide improvements in dynamometric means or strain-gauges and force-and-torque-indicators and to free such devices from any of the mechanical units such as dial indicators, verniers and the like, which have heretofore generally been associated with such devices.

Another broad object of the invention is to provide improved measuring and indicating apparatus and components for such apparatus, which will greatly increase the range of possible uses thereof and/or will impart greatly enhanced accuracy and sensitivity to the indications yielded thereby.

Broadly, a characteristic of the invention involves the use, as an inherent component in a force-transmitting member or a deformable member the deformation of which is representative of the changes in a physical magnitude, of photo-elastic means adapted to undergo a change in color and/or brightness on changes in said transmitted force or on deformation of said member.

Where the invention is applied to a force transmitting member the location and characteristics of the photoelastic means are so predetermined that direct or indirect observation of said means will yield the requisite information, specifically the information as to whether or not a pre-specified limit has been exceeded.

The force-indicating factor is in every case a luminous magnitude such as a color shade and/or a degree of brightness.

Where the invention is applied to a tool for indicating or monitoring the force with which the tool is operated, the photo-elastic means may be so predetermined as to yield a full and straight-forward change in color tone as a predetermined limiting value of said force is exceeded.

The term "photo-elastic material" as used herein refers to material which exhibits changes in optical properties when subjected to stresses, i.e., when in the unstressed condition they are isotropic and become anisotropic when stressed. Those materials are usually isotropic, transparent or translucent, dielectric materials which are generally long-chain polymers and include, but are not limited to, epoxy resins, i.e., resins having the general chemical formula

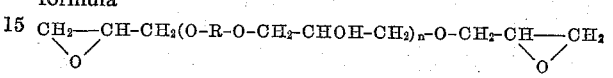

wherein R represents an aromatic group, polyvinyl acetate, cellulosic sheet material, polymers of methyl methacrylate, polyesters, urea-formaldehyde and melamine formaldehyde resins, and gelatins.

Where the invention is applied to dynamometer apparatus a continuous variation in brightness may preferably be made use of, in cases where monochromatic illumination is used, or a continuous variation in color where a double refraction effect is employed.

In the ensuing exemplary description reference is made to the accompanying drawings wherein:

FIG. 1 is a general showing of an improved tool according to the invention;

FIG. 2 is a larger-scale view in section on line 2—2 of FIG. 1;

FIG. 3 illustrates part of a tool similar to that shown in FIG. 1 but relates to a modified embodiment;

FIG. 4 shows a suspension hook according to the invention forming part of hoisting apparatus;

FIG. 5 is a diagrammatic illustration of hoisting apparatus;

FIG. 6 shows a dynamometer ring appliance according to the invention;

FIG. 7 is a simplified showing of a pressure pick-off according to the invention;

FIG. 8 is a similar view of a modified pressure pick-off device;

FIG. 9 is a diagrammatic view of yet another device constructed according to the invention; and FIG. 10 illustrates a measuring or recording installation according to the invention.

First referring to FIGS. 1 and 2, an improved key or wrench 10 comprises a stem or handle 11 and a head 12 internally formed with a hexagonal aperture 13. Inserted at a predetermined location in the key, specifically adjacent to the connecting portion 14 between the stem 11 and the head 12, is a photo-elastic indicator assembly generally designated 15. As shown in FIG. 2 the indicator assembly comprises a photo-elastic plate or strip 16 of the type exhibiting a variable degree of double refraction according to the strain developed in the strip, applied against the bottom wall 18 of a recess or socket 19 formed in the key, and a polarizer unit 17 overlying the birefringent strip 16. Instead of a strip the element 16 may simply comprise a suitable layer of birefringent varnish or other birefringent composition. Such an element when viewed through a polarizer will display variable shades of color and/or variable fringe patterns when the element is connected to some mechanical component subjected to strain. The variations will either involve an area comprising a given shade of color, or will involve the substitution of one color for another in a given spatial position or may assume the form of color fringes, or again a variation in brightness where monochromatic illumination is used.

In the case of a wrench being described the characteristics of the photo-elastic means and particularly its depth dimension and its position on the wrench preferably are so predetermined that a clear and straightforward change in color will be displayed as the torque applied to the handle 11 of the wrench exceeds a definite predetermined value.

As shown in FIG. 2 it is contemplated according to the invention to provide an indicating assembly 15 of the kind described above, on each of the opposite sides of the tool, for convenient observation by the operator without his having to trouble about which side is uppermost as the operator grasps the tool.

In the form of embodiment shown in FIG. 3 the socket formed in the tool for receiving the photo-elastic assembly has only half of its area filled with the assembly which is provided in the form of a semi-circle 20 while the other half of the recess contains a complementary semicircular element 21 which is of fixed unchanging color. The arrangement is such that, as long as the tool is transmitting a force or torque lower than a prespecified limit the semi-circular element 20 differs in color from the semi-circular element 21, while on attaining said limit the element 20 asumes the same color as the element 21. The color of the "control" element 21 may be produced by applying paint or coating or using a crystalline strip or in any other way.

FIG. 4 illustrates an embodiment of a hoisting or suspension hook according to the invention. The hook 22 supports on at least one of its sides a photo-elastic element 23 in the form of a strip or a coat of varnish and a window 24 is formed in it for observing the varying light pattern caused by the variable birefringence of the strip 23 due to the varying strains therein on variation of the forces transmitted by the hook. Desirably the window 24 is formed at that point of the hook structure where it will be most liable to break under excessive loading. The photo-elastic unit is so arranged as to display a substantially sudden variation in the light pattern observed therein as the safety limit is attained. Thus the operator of the hoisting apparatus will simply be required to glance at the window 24 on attachment of each new load to the hook in order to check whether said load may be safely hoisted and conveyed by the apparatus. Not only will a hoist hook constructed as just described provide full safety in the operation of hoisting and similar equipment but it will also insure that such equipment is being utilized with the highest possible efficiency factor since the operator will in every instance be in a position to select a load approaching the maximum capacity of the equipment, provided of course the load is of such character that its weight can be selectively controlled.

It will be understood that the invention is applicable to components of hoisting equipment other than a suspension hook, as well as to other apparatus than hoisting equipment.

Thus FIG. 5 diagrammatically illustrates a hoisting apparatus generally designated 25, provided with two photoelastic units according to the invention, one unit 26 being positioned adjacent to the point of assembly of the horizontal beam 27 with the upright 28 and the other unit 29 at the base of the upright and near the side thereof on which the beam is supported. It will be understood that the beam and upright 27 and 28 may comprise composite structures such as lattice girders even though they have been shown solid for simplicity. Observing and/or recording the indications given by the photo-elastic units such as 26 and 29 will insure against the occurrence of any condition where the stresses applied to the hoisting structure will exceed permissible safety limits.

Reference will next be made to FIG. 6, which illustrates an annular dynamometer member 30 of a general type known per se, adapted to be interposed between two pressure members or plates 31 and 32 urged toward one another by a compression force applied to one or both members. A conventional dial indicator 33 is shown as mounted centrally of the annular member 30. According to the invention each arm or half of the annular member 30 supports a strip 34 and 35 which may be either continuous or discontinuous in character, and comprising a high-sensitivity photo-elastic material with an overlying polarizer unit. The two sides of the annular structure are identical and have identical characteristics so that, as long as the stresses urging the members 31 and 32 towards each other are exerted in a prescribed normal direction the two sides will assume identical colors and/or will display identical fringe patterns. However assuming that the compression force is not directed exactly in the prescribed direction normal to both members, e.g. on occurrence of an undesirable bending or twisting component, the two sides of the structure will display different light patterns. This will warn an observer of a maladjustment or malfunctioning of the mechanical assembly of which the members 31 and 32 form part and will warn him of the fact that the indications supplied by dial indicator 33 are no longer trustworthy. The machine may then be readjusted to restore identical light patterns in both sides of the annular structure, whereupon the indications of the dial instrument 33 may once again be relied upon.

Moreover, in cases where it may be desired to limit to a predetermined maximum value the compression force on the plates 31 and 32, it is contemplated that a photoelastic unit may be mounted on one or on each side of the annular dynamometer member in a manner generally similar to that described hereinabove in connection with the other forms of embodiment illustrated, so that the dial indicator 33 may then be completely omitted.

Other applications contemplated for the invention in addition to an annular dynamometer or strain-gauge of the type shown in FIG. 6, comprise dynamometers or strain-gauges of the flexed-strip type and torque-indicators of the type e.g. using a cylindrical or square shaft subjected to static or dynamic torsion, and a frame; in any such device a photo-elastic unit or units may be suitably mounted in the general manner explained hereinabove to provide a visual indication of the magnitude of the stress transmitted through the dynamometer or other device.

In order to increase the accuracy of the measurements of force or torque, the system may include a polariscope device preferably associated with a compensator of any suitable type, such as a Babinet, penumbra, photo-cell compensator or the like.

Particularly in those cases where a photo-elastic means according to the invention is used as a safety device, it is contemplated according to the invention that the variation in color or brightness thereof may serve to operate a warning signal device, and/or means for automatically removing or reducing the excessive load on the apparatus with which the said means is associated.

The invention is susceptible of a wide diversity of applications in addition to those described above. Thus FIG. 7 illustrates by way of a further example, a form of the invention as applied to a pressure pick-off device. A resiliently deformable diaphragm 40 forms part of a wall 41 of an enclosure whereof the internal pressure is to be measured, indicated or recorded. Bonded to the diaphragm in any suitable way is a photo-elastic strip or element 42 which participates in the deformations of the diaphragm. The deformation of the element induces birefringency therein and the degree of the birefringerant effect is a measure of the pressure within the enclosure.

In a modified form the photo-elastic element, such as a strip or coating, is directly bonded to the wall of the enclosure. In such case the element may be metal-coated on one of its sides.

In the form of embodiment shown in FIG. 8 there is bonded to the front face of the strip 42 a crystal, or birefringent, plate 43 and a polaroid element 44 is bonded to the crystal plate. Here, a crystal, or birefringent, plate refers to a section, cut parallel with the optic axis of a material (mica, quartz, etc.), which is inherently birefringent according to its thickness.

The inclusion of a means 43 generating an inherent or bias birefringence upon which the load-related forced-birefringence (of strip 42) is superimposed provides a bias control with the concomitant advantages of selectivity and background suppression that bias control contributes, for example, to vacuum tube modulators.

Improvements in photoelastic means, per se, such as illustrated in the FIGURE 2 and FIGURE 8 embodiments of the dynamometers of this invention, are the subject matter of the copending application of Felix Zandman, S.N. 72,838 filed December 22, 1960, (a continuation of application S.N. 650,250 filed April 2, 1957, now abandoned) and assigned to the same assignee as is this application. Reference may be had, therefore, to that application for a more detailed description of photo-elastic phenomena. A photo-electric cell may be positioned in front of the FIG. 8 assembly as shown at 45 to respond to the resulting variations in illumination from the assembly.

The invention may be used for other types of measurement and indication than those described above, and including e.g. the flow velocity of a fluid, vibrations of all kinds, displacements, etc. Thus FIG. 9 diagrammatically illustrates by way of example a set-up for measuring wind velocity and variations in said velocity. The apparatus includes a flexible strip 60 having one end 61 rigidly sealed in a supporting base and a photo-elastic strip 62 bonded to one side of the strip 60. When installed in the windflow the flexible strip 60 will bend and the photo-elastic element 62 will display birefringent effects representative of the deflection and hence the wind velocity. If desired a polaroid element or a polaroid with additional birefringent strip may further be bonded to the surface of element 62.

The invention may also contemplate improving the operation of vibration pick-off devices by bonding photo-elastic strips to calibrated elements.

In all cases the measurement of the birefringent effect in the photo-elastic elements of the invention may be performed by means of a reflection polariscope or a polarizing microscope of the reflection type.

Thus in the set-up shown in FIG. 10 the photo-elastic strip or coating, shown by way of example as bonded to a diaphragm 40 forming part of a wall of an enclosure 41 the internal pressure in which is to be measured, is impinged on by a pencil of light rays issuing from an objective lens 57 illuminated from a semi-reflective mirror surface 58 inclined at 45° to it, the incident pencil of light 46 being supplied from a light source 47 through an interposed polaroid strip 48, a quarter-wave plate 49 and a monochromatic filter plate 50. The light reflected from metallized surface 51 is again passed through lens 57 and traverses the semi-reflective plate 58, then a quarter-wave plate 52 and an analyzer 53, and is collected in a suitable pick-up device for indication or recording. In the exemplary installation shown the pick-up device comprises an ocular lens 54 and a photo-electric cell 55 having its terminals connected by leads 56 with a suitable indicating and/or recording device such as a galvanometer, a recording oscillograph, or the like, not shown.

A measuring installation of the general character just described has the following advantages:

The measuring instrument proper is separate from the diaphragm or other pick-off device and may be positioned at a remote point from it;

The sensitivity may be controlled by adjustment of electronic amplifier means, such as a photo-cell of the electron multiplier type, or an electron multiplier associated with the photo-cell;

Both static and dynamic calibration are readily effected;

The installation permits of effecting measurement at remote locations without physical contact with the part being tested or the pick-off;

The thickness dimension of the photo-elastic strip may be selected in advance to obtain any predetermined sensitivity;

A polariscope may easily be applied for checking whether the pressure is correctly transmitted, as by observing the symmetry and uniformity in aspect of the polariscope image.

*Example.*—In one installation it is desired to record both static and dynamic pressures in a range of from 0 to 2 kg./sq. cm. The diaphragm material and thickness is selected so that the maximum strain due to the 2 kg./sq. cm. pressure will be about 12 kg./sq. mm. in the case of a steel diaphragm. A photo-elastic element 3 mm. thick is used so that the 12 kg./sq. mm. pressure will produce approximately one fringe, corresponding to a lag in the order of the $0.6 \times 10^{-3}$ mm. In this case either of two procedures may be followed.

(a) The results can be observed and measured using optical compensators to indicate the pressure and the light source may be replaced by a stroboscope (measurement of reciprocating pressures);

(b) or the results can be recorded by means of a photo-cell. The cell may be so adjusted as to record relative elongation values of $10^{-8}$ and as little as $10^{-9}$, i.e. strains in the order of $20 \times 10^{-6}$ kg./sq. mm. in the case of steel, and hence pressures and pressure variations in the order of $3 \times 10^{-6}$ kg./sq. cm.

What is claimed is:

1. A dynamometer adapted to be interposed between two members, between which members force is exerted said dynamometer comprising an annular member having the force exerted along a first diameter thereof, a photo-elastic element connected to said annular member at each end of a second diameter thereof at substantially 90° to said first mentioned diameter whereby a force exerted at an angle other than 90° to said second diameter causes unequal change in the aspect of said photo-elastic elements.

2. A dynamometer for the indication of attainment of a predetermined condition of a load transmitted between a loading and a loaded means which dynamometer comprises a resilient load transmission means adapted to be coupled in series between the loading means and the loaded means transmitting the load therebetween when so coupled, a photoelastic means affixed to said transmission means generating differing visible polarized light fringe patterns in response to differing conditions of said load, and contiguous with said photoelastic means a reference means exhibiting a visible reference pattern corresponding to at least one of said fringe patterns, whereby visible correspondence of said fringe and reference patterns is determinative of attainment of said predetermined load condition.

3. The dynamometer of claim 2 in which the said resilient load transmission means comprises a plurality of similar members, said photoelastic means is affixed to one of said members, said reference means is affixed to another of said members, and said reference means is substantially a duplicate of said photoelastic means, whereby said visible correspondence is determinative of the transmission of equal load components by said one and another of said plural members.

4. An indicator combination for adapting conventional load transmitting tools of the type having a resilient load transmission element for use as transmission dynamometers indicating attainment of at least one predetermined condition for a load transmitted through the resilient element, which combination comprises a photoelastic means generating differing visible polarized light fringe patterns in response to differing conditions of said load affixed about a periphery of a surface thereof to said resilient element and a reference means contiguous with said photoelastic means exhibiting a visible reference pattern corresponding to at least one of said fringe patterns, whereby visible correspondence of said fringe and reference patterns is determinative of attainment of said predetermined load condition.

5. In a load transmitting member, an arrangement for indicating attainment of at least one predetermined condition for a load transmitted by said member, which arrangement comprises a photoelastic means affixed to said member in a position to be influenced by the load transmitted thereby, said photoelastic means being capable of generating differing visible polarized light fringe colors in response to differing conditions of the load transmitted by said member, and a reference means contiguous to said photoelastic means, said reference means exhibiting a visual reference color corresponding to at least one of said fringe colors, whereby visible correspondence of said fringe and reference colors is determinative of attainment of said predetermined load condition.

6. The dynamometer of claim 2, wherein said load is a torque load and said load transmission means is a torque wrench.

7. The dynamometer of claim 2 wherein said photoelastic means comprises a photoelastic strip affixed to said transmission means, a birefringent plate overlaying said strip, and a polarizer overlaying said plate.

References Cited in the file of this patent

UNITED STATES PATENTS

| | | |
|---|---|---|
| 2,014,688 | Mabboux | Sept. 17, 1935 |
| 2,415,436 | Maris | Feb. 11, 1947 |
| 2,625,850 | Stanton | Jan. 20, 1953 |

FOREIGN PATENTS

| | | |
|---|---|---|
| 817,044 | Germany | Oct. 15, 1951 |